April 1, 1952     B. H. BIBLE     2,591,499
COAL TONGS
Filed Sept. 25, 1947
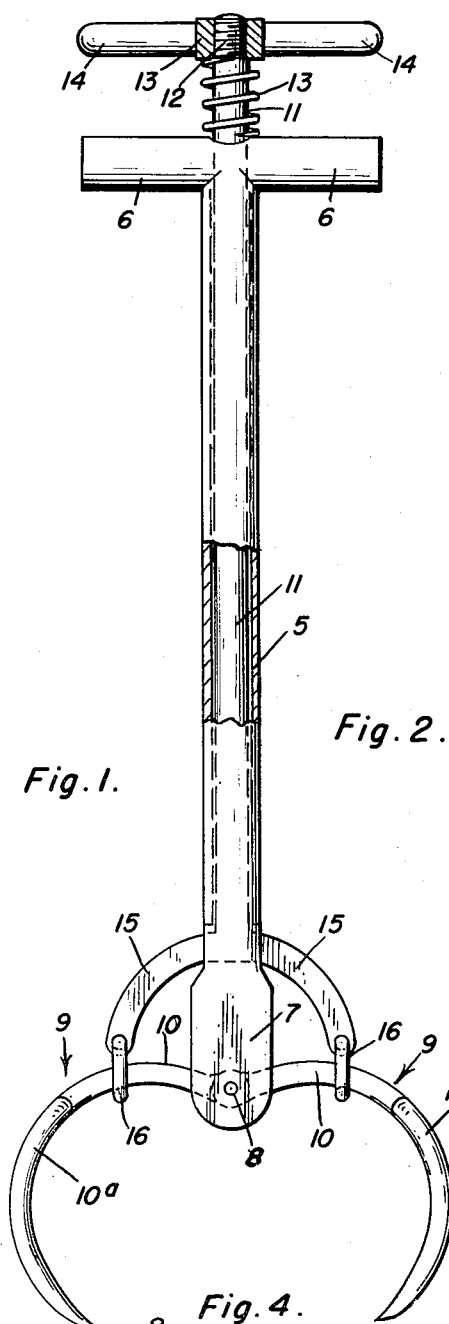
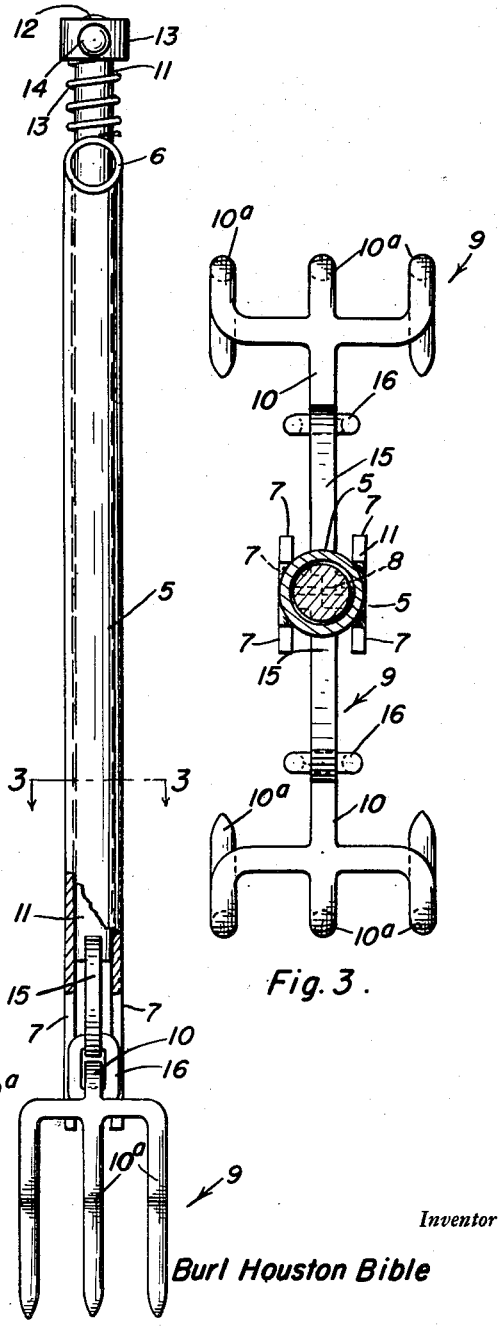
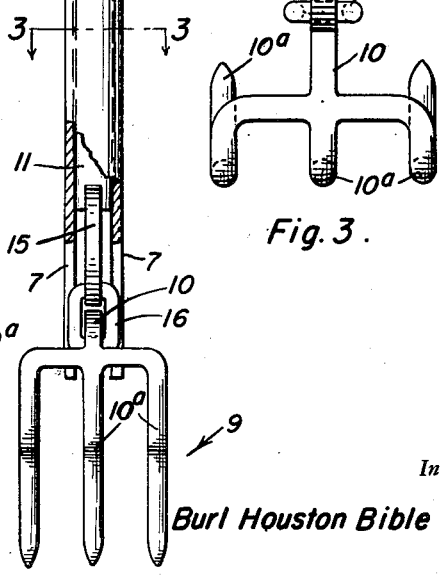
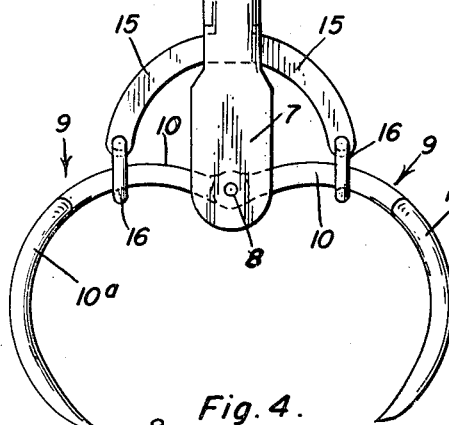
Inventor
Burl Houston Bible
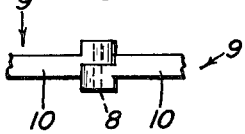
Attorneys Patented Apr. 1, 1952

2,591,499

UNITED STATES PATENT OFFICE 2,591,499

COAL TONGS

Burl Houston Bible, Laurens, S. C.

Application September 25, 1947, Serial No. 776,115

2 Claims. (Cl. 294—115)

1

The present invention relates to certain new and useful improvements in tongs expressly, but not necessarily, adapted for handling hot coals, clinkers and other analogous objects.

Manifestly, that field of inventions appertaining to tongs and similar implements is highly active and is, as a matter of fact, well developed. It follows that, at this time, I am offering, as a newcomer to the art, a pair of tongs possessed of certain refinements and structural improvements, all features functioning, collectively, to provide a tool of requisite simplicity and efficiency.

In carrying out the principles of the instant invention, I have evolved and produced a simple and practical implement which is characterized by telescoping members, said members having coacting hand-grips with spring expansion means interposed therebetween, there being complemental jaws pivotally hung for swinging on the outer end of one of the members and suitable operating connections being provided to swing the jaws toward and from each other.

Referring now to the drawings:

Figure 1 is a view partly in section and partly in elevation showing coal tongs constructed in accordance with the inventive principles herein under advisement.

Figure 2 is an elevational view, partly broken away, of the implement at right angles to Figure 1.

Figure 3 is a sectional view on the line 3—3 of Figure 2.

Figure 4 is a fragmentary view of certain of the details.

Referring now to the drawings by distinguishing reference numerals, the numeral 5 designates a suitably elongated tubular handle member having integral right angularly disposed hand-grips 6 at its inner end, the end next to the user. The corresponding or outer end of said tubular handle member is longitudinally split and the coacting portions are spread apart and flattened to provide spaced parallel ears 7. There is a pivot pin 8 between these ears and this serves to mount and accommodate the duplicate object gripping jaws 9. Each jaw comprises curved tines or fingers 10a attached to an arcuate shank 10, each shank having a terminal eye at its inner end which is hingedly connected to the hinge pin 8. More specifically, the inner ends of the respective shanks terminate in eyes which overlap and are mounted on said hinge pin. Slidable in the tubular handle is a reciprocatory operating rod 11 whose outer end extends beyond the handgrip 6, where it is screw-threaded, as at 12. A nut 13 provided with hand-grips 14 is threaded on said rod and a coiled spring is situated as shown and thus located between the respective hand-grips, as at 13. The spring is normally expanded. A substantially semi-circular member is integrated with the inner projectable and retractable end of the rod 11, said rod and member sliding back and forth between the ears 7. The stated semi-circular member is in a plane with said shanks 10 and the curvate end portions thereof, that is, the ends 15 terminate adjacent to the intermediate portions of said shanks and provide suitable actuators for the jaws and the terminals thereof have rings freely hinged and surrounding the respective shanks 10, the rings being denoted by the numerals 16. Normally the jaws are spread apart and held so by the spring means 13. By grasping the handles 6 and 14 and pressing the same together, the rod 11 is projected and the jaws, by way of the parts 15 and 16, are swung to closed position in an obvious fashion.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A pair of tongs of the class shown and described comprising an elongated open ended tubular member formed with lateral hand-grips at its inner grasping end and formed with a pair of flat spaced parallel comparatively broad ears at its opposite outer end, a single hinge pin mounted in and bridging the space between the outer end portions of said ears, a rod slidably mounted in said tube and having one end portion operable between said ears, the opposite end projecting beyond said hand-grips and being provided with additional hand-grips opposed to and operable in conjunction with the first named hand-grips, a coiled spring surrounding the rod and interposed between the respective sets of hand-grips, a pair of arcuate arms rigidly secured to the outer end portion of said rod and operable with the latter between said ears, said arms being diametrically opposite to each other and radial to the axis of said tubular member and having their outer ends projecting beyond the marginal edges of said ears, a pair of jaws having gripping fingers and respective inner ends of the shanks, the shanks of the respective jaws terminating and being situated between said ears and hingedly attached to the stated hinge pin, and rings hingedly mounted on the outer end portions of said arcuate arms and loosely embracing the shanks of the respective jaws.

2. A pair of tongs of the class shown and described comprising an elongated open ended tubular member having hand grips at one end and provided at an opposite end with a pair of spaced parallel ears, a single hinge pin mounted in and bridging the space between the outer end portions of said ears, a pair of duplicate jaws, each jaw embodying a shank provided at its outer end with gripping means, the inner ends of the respective shanks having overlapping eyes, said eyes being confined within the marginal limits of the ears and being hingedly anchored on said hinge pin, a semi-circular member slidably mounted between said ears and having curved end portions terminating adjacent the intermediate portions of the respective shanks, said end portions being provided with freely pivoted rings and said rings freely encircling the intermediate portions of said shanks, a rod slidably mounted in said tube and connected at one end to the intermediate portion of said circular member, the opposite end of the rod projecting beyond the corresponding end of the tube and being provided with hand grip means.

BURL HOUSTON BIBLE.

REFERENCES CITED

The following references are of record in the file of this patent:

UNITED STATES PATENTS

| Number | Name | Date |
|---|---|---|
| 294,147 | Poole | Feb. 26, 1884 |
| 504,600 | Manning et al. | Sept. 5, 1893 |
| 698,730 | McMasters | Apr. 29, 1902 |
| 1,025,360 | Auter | May 7, 1912 |
| 1,605,787 | Seim | Nov. 2, 1926 |
| 2,420,980 | Reise | May 20, 1947 |